United States Patent

[11] 3,539,037

| [72] | Inventors | Donald A. Brown;<br>Eugene M. Shirley, Dallas, Texas |
|---|---|---|
| [21] | Appl No | 847,787 |
| [22] | Filed | July 22, 1969<br>Continuation-in-part of Ser. No.<br>688,449, Dec. 6, 1967, abandoned |
| [45] | Patented | Nov. 10, 1970 |
| [73] | Assignee | Safety Chocks, Inc.<br>Irving, Texas<br>a corporation of Texas |

[54] SAFETY CHOCKS
7 Claims, 8 Drawing Figs.

[52] U.S. Cl. .............................. 188/32
[51] Int. Cl. ................................. B601 3/00
[50] Field of Search... ........ 188/4A, 32, 248/119

[56] References Cited
UNITED STATES PATENTS

| 2,189,323 | 2/1940 | Noonan.................. | 188/32 |
| 2,481,065 | 9/1949 | Auten. | 188/32 |
| 2,810,459 | 10/1957 | Nitz... | 188/32 |
| 3,265,159 | 8/1966 | Worden .............. | 188/32 |

FOREIGN PATENTS

| 1,445,750 | 6/1966 | France.. | 188/32 |

*Primary Examiner*—George E. A. Halvosa
*Attorney*—Burns, Doane, Benedict, Swecker & Mathis ABSTRACT: A wheel chock to be placed in abutting relationship with the wheel of a vehicle to prevent movement thereof, said chock including two inclined face members having teeth in their surface engaging edge which extend in the inclined plane of the face members, and structural support means rigidly engaged between the face members. The structural support means may include two side members of substantially uniform thickness extending between opposite edges of the face members, or a flat rigid plate extending horizontally between the face members across substantially the full width of the face members. In the latter arrangement the opening created between the face members and the flat plate may be utilized to facilitate the handling of the chock.

INVENTORS
DONALD A. BROWN AND
EUGENE M. SHIRLEY
BY Burns, Doane, Benedict, Swecker & Mathis
ATTORNEYS.

INVENTORS.
DONALD A. BROWN
EUGENE M. SHIRLEY

BY *Burns, Doane, Benedict, Swecker & Mathis*

ATTORNEYS.

3,539,037

SAFETY CHOCKS

RELATED APPLICATIONS

This application is a continuation-in-part of application Ser. No. 688,449, filed Dec. 6, 1967, now abandoned, for Safety Chocks.

BACKGROUND OF THE INVENTION

This invention relates to wheel chocks which are placed in abutment to a vehicle wheel to prevent rolling of the vehicle.

Many circumstances occur in using and maintaining an automobile which require the use of chocks to prevent rolling of the vehicle and thereby to insure the safety of the person or persons working on or with the automobile and/or others in the surrounding areas. Such circumstances exist for example when a tire is being changed, when the automobile is being loaded or unloaded, or when the automobile is parked on a steep grade.

Most chocks which have been used previously have consisted of wedge shaped blocks which are placed in abutment to the wheel. This type, however, has a tendency to slide under the weight of the vehicle. Still others have been provided with teeth formed on the bottom of the chock. These teeth extend vertically downward, therefore presenting a vertical restraining force to prevent sliding of the chock. These chocks, however, tend to rotate under the weight of the vehicle about a pivot point formed by the set of teeth. This problem of rotation is especially true when using the chock on a steep grade.

Furthermore, presently used chocks when used on relatively soft surfaces tend to move laterally or skew under the weight of the vehicle.

Another problem with presently used chocks is storing them within the automobile. Presently used chocks are bulky and use up much needed storage space especially in increasingly popular small cars where storage space is at a premium.

A further disadvantage of presently used chocks is the difficulty encountered in removing them from their abutting relationship with a wheel of a vehicle especially where the vehicle has moved slightly so that the wheel rests partially on the chock. In the past it has often been necessary to move the vehicle itself to free the chock from engagement. Alternatively, several presently used chocks have been provided with hand holes to facilitate the handling of the chocks. These hand holes, however, have been awkward and difficult to utilize. In one known chock a hand hole is provided in an internal baffle and support plate which is difficult to reach and utilize. In another known chock a hand hole is provided at the top of the chock adjacent to a concave face member which is adapted to abut the wheel. Since this hand hole is spaced vertically above the ground engaging edge and adjacent to the wheel abutting face of the chock, a large force is necessary to remove the chock from engagement with the wheel of a vehicle. This greatly reduces the usefulness of the hand hole and increases the difficulty of handling the chock.

In addition these hand holes do not extend transversely through the chock to permit the use of an elongated object such as a tire iron to be inserted therein to aid in the removal of the chock from engagement with the wheel of a vehicle.

SUMMARY OF THE INVENTION

In recognition of the need for an improved wheel chock, it is therefore a general object of the present invention to obviate or minimize the previously mentioned problems.

Specifically, it is an object of the invention to provide a wheel chock which will not slide under the weight of the vehicle.

It is also an object of the invention to provide wheel chocks which will prevent rotation of the chock even under extreme conditions.

It is another object of the invention to provide wheel chocks which will store easily in a minimum of space.

An additional object of the invention is to provide a chock which is useful on hard as well as relatively soft surfaces.

Still another object of the invention is to prevent lateral movement or skewing when the chock is used on relatively soft surfaces. A further object of the invention is to provide a chock which may be easily removed from abutting engagement with the wheel of a vehicle.

A still further object of the invention is to provide a chock with a transverse aperture useful as a hand hole.

Another object of the invention is to provide a chock with a transverse aperture through which an elongated object may be inserted to aid in the removal of the chock from abutting engagement with the wheel of a vehicle.

These objects are accomplished in accordance with this invention by a hollow chock of substantially triangular shape provided with two inclined face members having teeth formed in the lower edge and extending in the inclined plane of each of said face members. The teeth being provided in the inclined plane shifts the potential pivot point away from the applied force, the weight of the vehicle, which tends to rotate the chock, and reduce the effect of the applied force since only the component normal to the plane of the teeth is capable of rotating the chock. In one embodiment side members extending between opposite side edges of the face members structurally strengthen the chock and prevent lateral movement or skewing when the chock is used on relatively soft surfaces. In this embodiment, the chocks, being hollow and uncluttered internally, may be stacked or nested together thereby minimizing the space needed in which to store them. In a second embodiment a flat plate extending horizontally between the face members across substantially the full width of the face member, structurally strengthens the chock and provides a transverse aperture useful as a hand hole or for the insertion of an elongate object to facilitate the removal of the chock from abutting engagement with the wheel of a vehicle.

Other objects and advantages of the present invention will be apparent from the appended claims and the detailed description when read in conjunction with the attached drawings.

DETAILED DESCRIPTION

Figure 1:
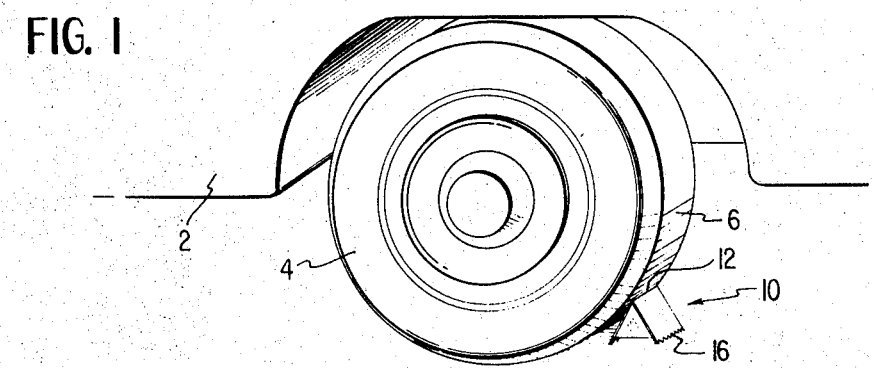
FIG. 1 is a pictorial view of one embodiment of the invention as used to restrain a wheeled vehicle.

One embodiment of the present invention will now be described with respect to FIGS. 1—4. Referring to FIG. 1, a vehicle 2 with a wheel 4 is shown being prevented from rolling by a chock 10. As illustrated in FIG. 1, the surface engaging tread 6 of the wheel 4 abuts against an upper corner 12 of the chock 10 and an upper portion of one of the face members 14 applying forces normal to the face member thus engaged which tend to rotate the chock especially when it is being used on a steep grade. Rows of teeth 16 formed in a lower edge and extending in the same inclined plane of the face members 14 grip the surface. Since the teeth furthest away from the wheel are the potential pivot point of rotation under the above-mentioned applied forces, providing the teeth in the inclined plane of the face member moves the potential pivot point further away from the wheel thereby reducing the component of the applied forces capable of causing such rotation. Additionally, the angle between the applied forces and the plane of the teeth furthest away from the wheel is increased, further reducing the component of force capable of rotating the chock since only that component of force normal to said plane can cause such rotation.

The chock 10 will now be described in detail with reference to FIGS. 2, 3a and 3b.

Figure 2:
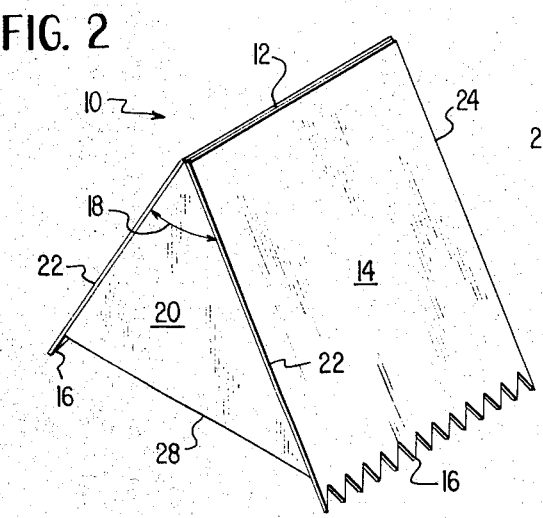
FIG. 2 is an enlarged pictorial view of the embodiment of the present invention illustrated in FIG. 1.
Figure 3A:
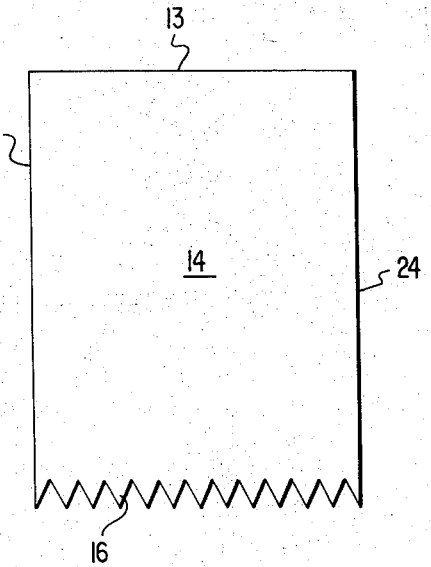
FIGS. 3a and 3b represent a face and side member respectively of the embodiment illustrated in FIG. 2.
Figure 3B:
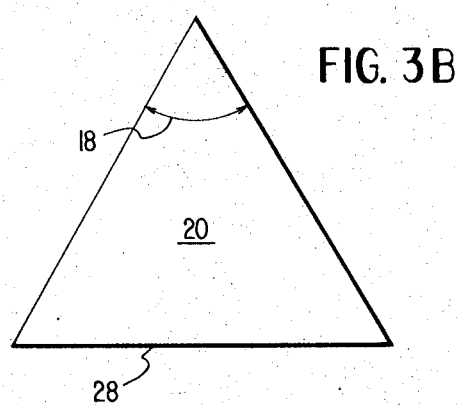

The chock 10, as shown in FIG. 2, is a hollow, substantially triangular shaped wedge formed from two identical face members 14 and a pair of side members 20. Only one face member 14 and side member 20 are shown since in both instances the second member is substantially the same.

The two face members 14 are joined together at their upper edges 13 to form the corner 12 or may be constructed of one continuous length of material which is folded to form the corner 12. The face members 14 extend angularly away from each other to form inclined planes with respect to each other and to the surface on which the chock will rest. Preferably, the angle 18 between the face members should be approximately 60°.

The teeth 16 are integrally formed in the lower edge and extend in the inclined plane of each face member 14 by cutting them directly into the face member 14. This also eliminates any costly manufacturing steps of welding or joining teeth to the chock.

The side members 20 are of substantially triangular shape and are connected between the opposite edges 22 and 24 respectively and the corner 12 of the two face members 14. They are of substantially uniform thickness throughout and terminate in lower edges 28 which are also of substantially the same thickness as the rest of the member.

This feature is especially advantageous when the chock is used on a relatively soft surface. The lower edges 28 will penetrate the surface and act to limit lateral movement or skewing of the chock when subjected to the weight of the vehicle.

Figure 4:
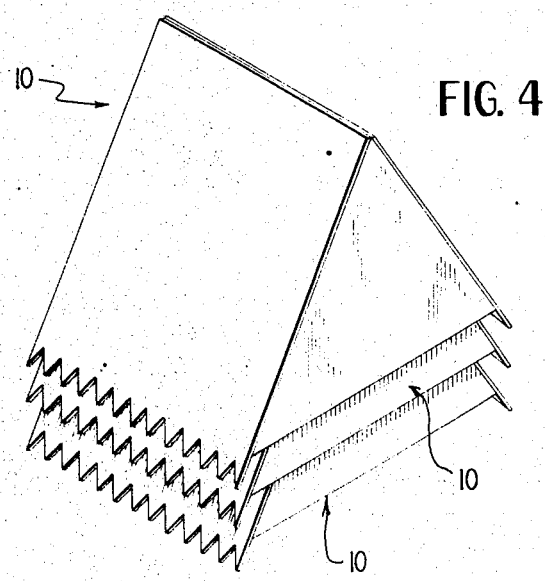
FIG. 4 is a pictorial view of a plurality of chocks of the embodiment illustrated in FIG. 2 nested together for storage.

FIG. 4 shows a plurality of chocks nested or stacked together for storage. This is accomplished since the chocks are hollow and do not require any internal reinforcing members which would prevent nesting the chock together.

Figure 5:
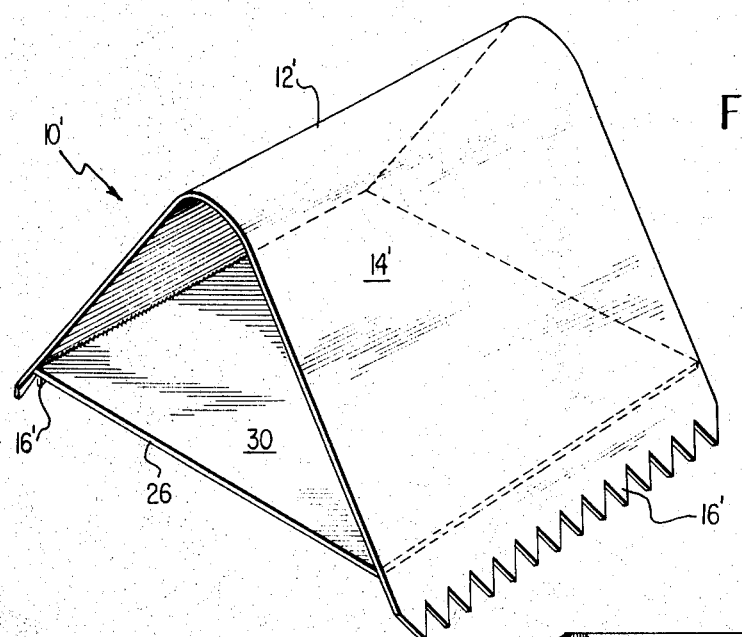
FIG. 5 is a pictorial view of a second embodiment of the present invention.
Figure 6:
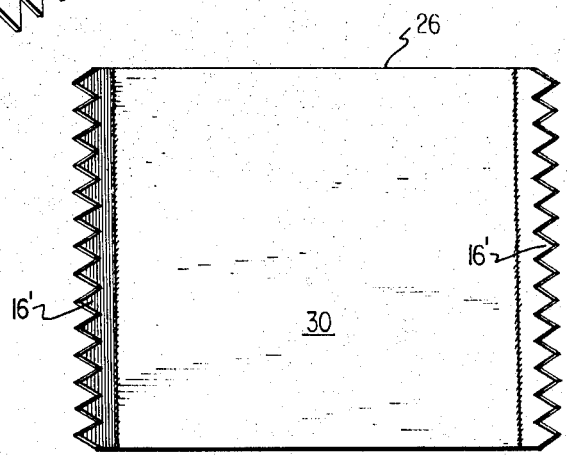
FIG. 6 is a bottom view of the second embodiment of the chock illustrated in FIG. 5.

A second embodiment of the present invention will now be described with respect to FIGS. 5, 6 and 7. Referring to FIG. 5, the chock 10' is substantially the same as the previously described chock 10 having a pair of inclined face members 14' with the rows of teeth 16' extending in the inclined plane of the face member and formed integrally therewith. In the illustration of FIG. 5 the two face members 14' are shown as formed from one continuous length of material which is folded to form a corner 12'. Alternatively the face members may be formed from two separate sheets suitably joined at one edge to form the corner 12'.

Instead of the side members 20 extending between the edges of the face members 14 as in the previously described embodiment, the chock is rigidified by a flat plate 26 extending horizontally between the internal surfaces of the face members 14'. The plate 26 as shown in FIG. 6, extends substantially the full width of the face members 14' and is secured to the internal surfaces of the face members 14' just above the rows of teeth 16' by any suitable method such as welding.

The face members 16' and the flat plate 26 form a transverse aperture through the chock 10' which may be utilized to facilitate the handling of the chock 10'. The transverse aperture may be utilized as a hand hole or for the insertion of an elongated rod such as a tire iron to facilitate the removal of the chock from abutting engagement with the wheel of a vehicle.

Figure 7:
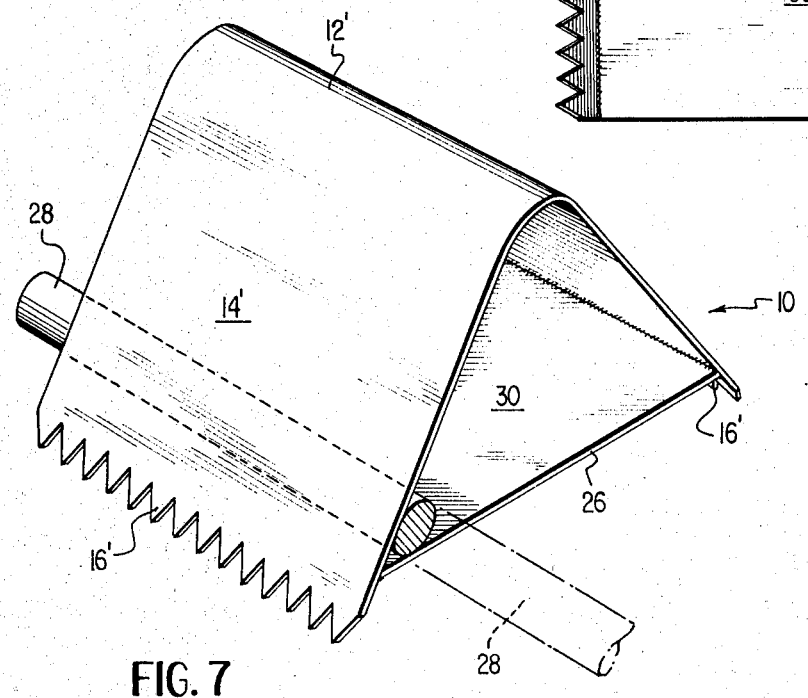
FIG. 7 is a pictorial view of the second embodiment of the chock illustrating one method of handling of the chock.

As illustrated in FIG. 7, an elongated rod 28 such as a tire iron may be inserted through the transverse aperture formed by the face members 14' and the flat plate 26 and seated in the angle formed between one of the face members 14' and the upper surface 30 of the flat plate 26. The elongated rod 28 is seated in the lower portion of the chock 10' adjacent to the ground engaging teeth 16'. Thus the force required to remove the chock 10' is reduced and the removal of the chock 10' from abutting engagement with the wheel of a vehicle is significantly facilitated, especially where the wheel of the vehicle is partially resting on the chock 10' itself.

Preferably, the chocks may be formed out of sheet metal of sufficient gauge to provide the required strength. The various edge connections may be accomplished by any suitable means such as welding or soldering. However, the chock may be made out of any other suitable material and joined by any means compatible with the material used.

When used in conjunction with automobiles, these chocks are preferably formed from face members 3½" long by 3½" wide and side members forming an isoceles triangle with sides 3¼" long and a base 3½". In the second embodiment the face members are preferably 3¾" inches long by 3½" wide and a square plate 3½" on each side. In both embodiments the teeth 14 are preferably cut to extend one-fourth inch.

Thus, the present invention provides a wheel chock which prevents sliding and/or rotation of the chock under the weight of the vehicle even under extreme conditions. Furthermore, in one embodiment the present invention provides a chock which may be utilized on relatively soft as well as hard surfaces and which prevents lateral movement or skewing of the chock when used on relatively soft surfaces. In a second embodiment the present invention provides a chock which may be easily removed from abutting engagement with the wheel of a vehicle.

Although the invention is described with reference to certain preferred embodiments, it will be apparent to those skilled in the art that additions, deletions, modifications, substitutions and other changes not specifically described or illustrated in these embodiments may be made which will fall within the purview of the appended claims.

We claim:

1. A wheel chock to be placed in abutment to a wheel of a wheeled vehicle to prevent movement of said vehicle comprising:
   two inclined planar face members joined along one edge and extending angularly away from each other, said planar face members being formed from sheet material;
   teeth adapted to grip the surface on which the chock is placed integrally formed on the inclined planar face members on an edge opposite to the joined edge, said teeth extending in the same plane as the inclined planar face members; and
   side members, substantially triangular in shape and extending between the planar face members, said side members being of substantially uniform thickness.

2. Apparatus to prevent movement of a wheeled vehicle comprising a chock including:
   two inclined planar face members joined along one edge and extending angularly away from each other, said planar face members being formed of a sheet material;
   teeth integrally formed on the inclined planar face members on an edge opposite to said joined edge, said teeth extending in the inclined plane of said planar face members; and
   side members of substantially triangular shape extending between said planar face members; and
   said chock being placed in abutment to a wheel of said wheeled vehicle so that the wheel engages the upper portion of the planar face member of said chock facing it and said joined edges of said planar face members wherein the weight of said vehicle acts to press said teeth into the surface on which said chock is placed in the angular direction of the planes of said inclined planar face members.

3. A wheel chock to be placed on a surface in abutment with a wheel of a wheeled vehicle to prevent rolling of said vehicle comprising:
   two inclined planar face members joined along one edge and extending angularly away from each other at a substantial angle from a plane normal to the surface on which the chock is placed, said planar face members being formed from sheet material;
   teeth adapted to grip the surface on which the chock is placed integrally formed on the inclined planar face members on an edge opposite to the joined edge, said teeth extending in the same plane as the inclined planar face members to penetrate the surface angularly with respect to the normal of the surface;

a flat plate extending horizontally between said planar face members, said plate being secured to said planar face members at a position adjacent said teeth and extending substantially the full width of said planar face members, said plate and said face members forming a transverse aperture extending through the chock; and a seat for receiving an elongated rod to facilitate the removal of the chock from abutting engagement with the wheel of the wheeled vehicle.

4. A wheel chock comprising:

two oppositely disposed inclined planar face members formed from substantially sheet material including:
an upper edge,
a lower edge, and
two side edges;

said inclined planar face members being joined at their upper edges;

teeth integrally formed in said lower edges and extending in the inclined plane of said planar face members; and two side members connected to the side edges of said planar face members and extending between opposite inclined planar face members, said side members being of substantially uniform thickness and being adapted to penetrate relatively soft surfaces thereby preventing lateral movement and skewing of the chock when subjected to the weight of a vehicle with which the chock is being used.

5. A wheel chock as claimed in claim 4 in which said chocks are of hollow construction to permit stacking of the chocks for storage.

6. A wheel chock comprising:

two oppositely disposed inclined planar face members formed from an elongated sheet material folded about a transverse axis substantially at its midpoint into an upper corner;

teeth integrally formed in the edges of said planar face members opposite said corner and extending in the inclined plane of said planar face members; and a flat plate extending horizontally between the internal surfaces of said planar face members at a position adjacent said teeth, said plate extending substantially the entire width of said face members whereby a transverse aperture is formed between said face members and said plate to facilitate the handling of the chock, said inclined planar face members extending angularly away from each other at a substantial angle from a plane normal to said flat plate.

7. A chock as set forth in claim 6, wherein said plate and said face members form a transverse seat in which an elongated rod may be seated to facilitate removal of the chock from abutting engagement of a wheel of a vehicle.